March 18, 1952  G. W. ASHLOCK, JR  2,589,324
FRUIT PITTING CHUCK

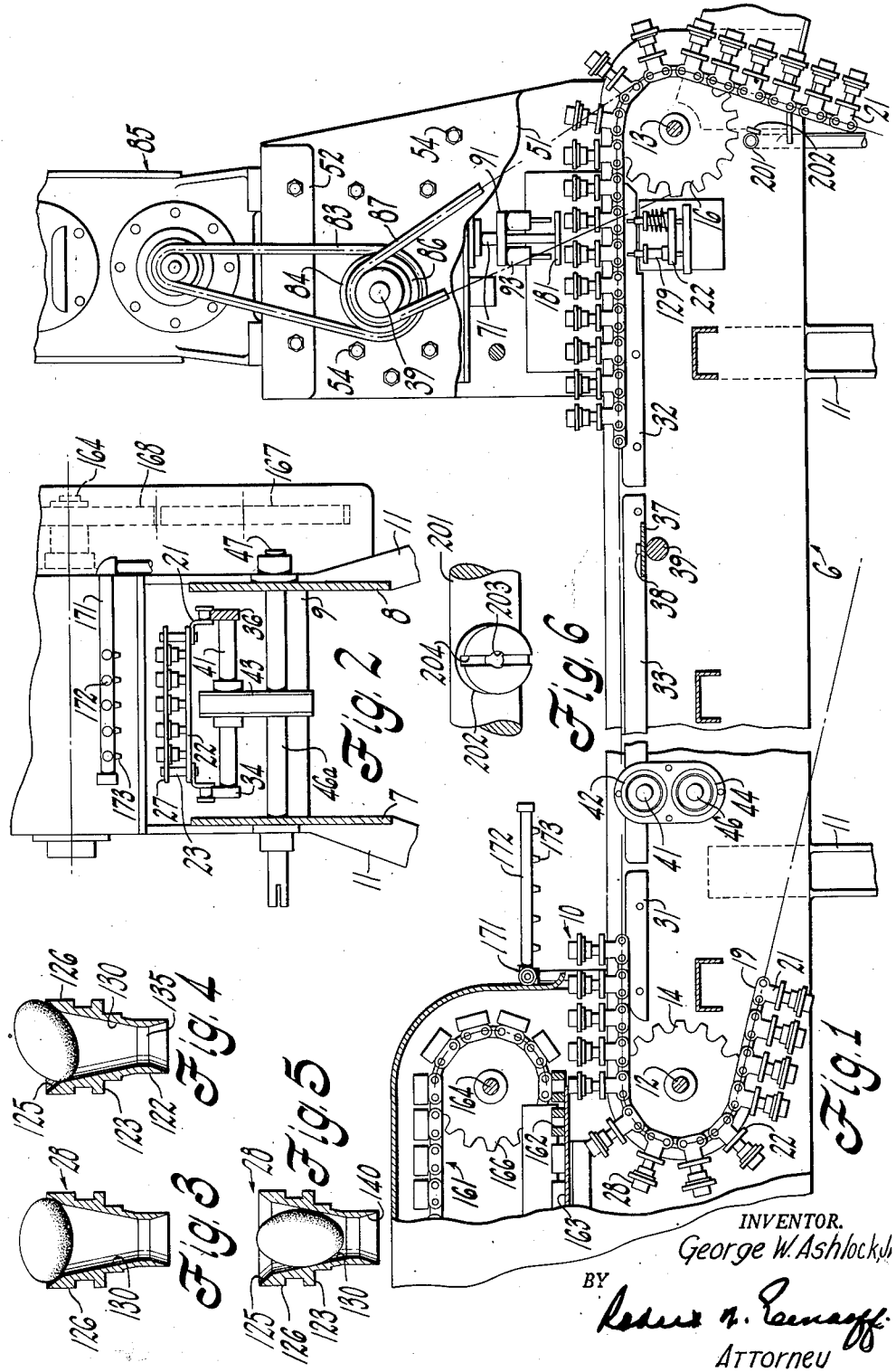

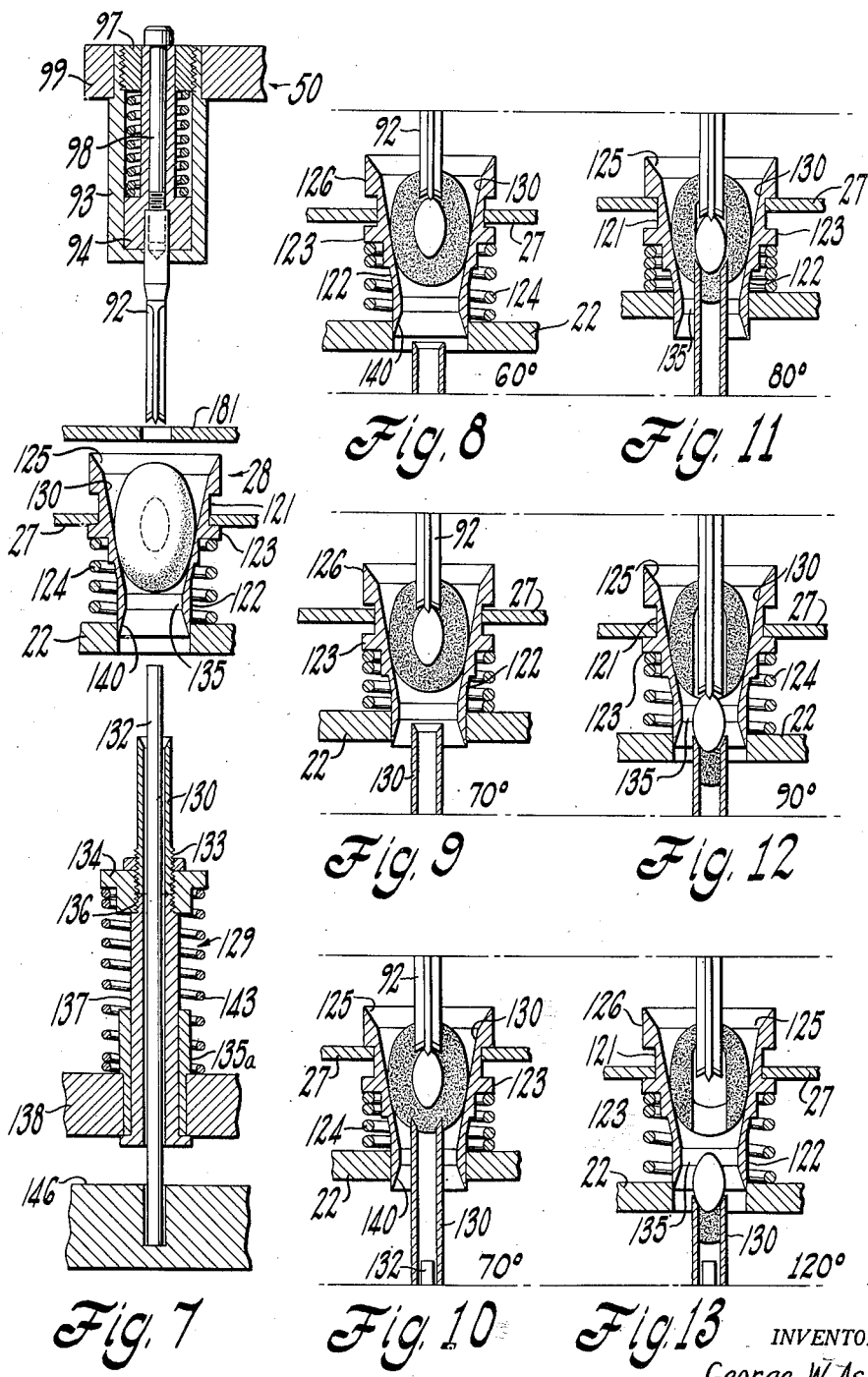

Filed Nov. 3, 1950  3 Sheets-Sheet 3

INVENTOR.
George W. Ashlock, Jr.
BY
Robert A. Zennoff
His attorney.

Patented Mar. 18, 1952

2,589,324

UNITED STATES PATENT OFFICE 2,589,324

FRUIT PITTING CHUCK

George W. Ashlock, Jr., Oakland, Calif.

Application November 3, 1950, Serial No. 193,927

4 Claims. (Cl. 146—17)

This application is a continuation-in-part of my application Serial No. 112,960, filed August 27, 1949 and of application Serial No. 169,691, filed June 22, 1950 and now abandoned.

This invention relates to a machine for removing the stone or pit from a fruit such as an olive, date, prune, apricot, plum, or the like. The invention is particularly suited to the removal of the stone from an elongated fruit in which the stone is held tenaciously by the flesh of the fruit; while the invention will be described as it has been practiced on olives, it will be readily apparent to those skilled in the art that the machine is useful for the pitting of prunes, dates and other elongated fruit.

It is desirable to effect removal of the stone or pit from an elongated fruit through an end of the fruit so that a minimum of removal and disturbance of the flesh occurs. To this end, it is therefore essential that the fruit be aligned, so that a knife or plunger can be brought into contact with the fruit and utilized to eject the pit from the fruit; thus, the knife or plunger is moved over a path coincident with the longitudinal axis of the fruit, which axis is also coincident generally with the longitudinal axis of the stone.

To the handling of fruit on a relatively large scale, it is essential that the pitting operation be carried on relatively rapidly and to this end, therefore, it is desirable that the fruit be oriented, preferably by mechanical means, inasmuch as such operation is much faster than a hand feeding operation.

In my prior Patents 2,250,518 and 2,271,675, I have proposed the use of a conical fruit carrying receptacle having a cavity therein in the form of an inverted frustum of a cone with the opposite cavity walls at an angle between about 32° and 44°. To effect orientation of a fruit in a machine disclosed in the aforementioned patents, it was only necessary to feed the fruit into the cavity which was thereafter suitably vibrated so that the longitudinal axis of the fruit was aligned with the axis of symmetry of the cavity. This operation was quite satisfactory upon fruit which was carefully graded and which was not unduly large. With relatively large fruit, for example, olives of the so-called jumbo, colossal or super-colossal grade, as these grades are defined in Section 870 of the Agricultural Code of the State of California, the fruit would frequently become positioned with its longitudinal axis in a horizontal plane and extended across the top of cavity so stably that it would not fall into place or alignment in the cavity. Upon advance of such a fruit into the pitting mechanism, the latter would function automatically with the result that the pit would be shattered in the fruit whereby pit fragments would be present in the fruit and the latter would not be completely pitted.

In accordance with the present invention, I provide a novel cavity construction suited to reception of relatively elongated fruit such as olives, dates, prunes and the like of all sizes so that these can be handled in one machine. This I accomplish by providing the cavity of a double conical construction; that is, the upper initial fruit receiving portion of the receptacle cavity is in the form of an inverted frustum of a cone with the walls at a relatively large angle; the cavity, however, is comprised mainly of another or an aligning portion, positioned beneath the first or receiving portion and in the form of an inverted frustum of a cone with the walls therefor at a relatively acute angle. Thus, if a fruit becomes positioned across the top of the cavity, defined by the relatively large angle of a frustum of a cone, the fruit has little resistance and slips readily into place upon vibration, subsequently becoming aligned in the acute, angled conoidal section of the cavity. As a result, the fruit, the stone in the fruit and the longitudinal axis of the cavity are substantially in alignment. Thus, to the handling of the fruit, irrespective of the size thereof, it is only necessary to feed the fruit into the individual carriers, as is disclosed in my Patent 2,250,518. The subsequent vibration of the carrier results in the fruit becoming aligned and, what is extremely important, particularly in the case of an elongated fruit such as an olive, prune or date, the relatively long, narrow stone is aligned with the axis of the cavity so that subsequently the stone is removed completely and entirely and fragments thereof are not left in the fruit.

Utilization of a conoidal cavity having the walls defining the alignment region at a relatively acute angle to one another presents a special problem in that the pitting operation in the fruit being jammed quite forcefully into the cavity with the result that subsequent removal of the pitted fruit is relatively difficult. This removal I have been able to accomplish by hydraulic means, spraying an extremely fine jet of a suitable liquid from a suitably positioned nozzle on the fruit to eject the pitted fruit from the cavity. Thus, it is not necessary to use mechanical fingers or picker means which might bruise or injure the fruit; at the same time the liquid washes away any fruit fragments; the fluid used can be water or a treatment solution such as a sugar solution, a flavoring solution or a preserving solution.

It is in general the broad object of the present invention to provide a novel form of mechanism for removing the pit from elongated fruit, olives, dates, prunes and the like.

Another object of the present invention is to provide a novel chuck construction for the pitting and orientation of fruit.

The invention includes other objects and features of advantage, some of which, together with the foregoing, will appear hereinafter wherein the present preferred form of mechanism of this invention is disclosed.

In the drawings accompanying and forming a part hereof, Figure 1 is a side elevation of a machine embodying this invention with portions thereof broken away to illustrate the construction employed.

Figure 2 is a section through the machine of Figure 1 showing the vibrating means employed.

Figures 3, 4 and 5 illustrate successive steps in the orienting of a fruit in the novel receptacle of this invention.

Figure 6 is a plan view of the spray nozzle and manifold employed in removal of pitted fruit.

Figure 7 illustrates the pitting mechanism at the commencement of a pitting operation.

Figures 8 through 13 are fragmentary views showing the course of a pitting operation.

Figure 14:
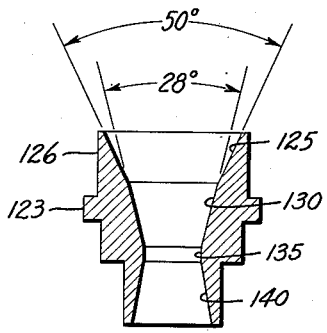
Figures 14, 15 and 16 are respectively sections through various specific forms of chucks embodying the present invention.

The machine of the present invention includes a suitable frame 6 made up of side plates 7 and 8 secured together by channels 9 and supported by legs 11. At opposite ends of the frame are provided shafts 12 and 13 mounted upon suitable bearings in the side plates 7 and 8. Sprockets 14 and 16 are respectively provided on shafts 12 and 13, there being two sprockets in each shaft and the sprockets being positioned adjacent to the plates 7 and 8 to support two endless chains 19 which extend about the sprockets. The several links comprising the chains 19 each include an angle piece 21 thereon extending toward the opposite chain (Figure 2). To each angle piece is secured a flat base plate 22. Studs 23 secure each base plate to each angle piece 21 and serve to position about the base plate, in a spaced relationship, a top plate 27. Mounted in each top plate are several article supporting receptacles 28, to be presently described in detail, and which provide an article conveyor generally indicated at 10.

The upper run of each chain is supported, as it advances to the right in Figure 1, by a first rail portion 31 provided by strip members secured to the side plates 7 and 8 and by a final rail portion 32 likewise including members secured to the side plates 7 and 8 and supporting the chains. An intermediate rail section 33 includes two opposite support rails 34 and 36 for the chains. At the right-hand end in Figure 1 these are secured together by plate 37 welded to each of the members 34 and 36. Plate 37 is secured by studs 38 onto a flat portion formed onto a shaft 39a; this shaft is rotatably mounted in suitable bearings (not shown) on each of the side plates 7 and 8 of the frame 6; adjacent their other end a shaft 41 secures the rails 34 and 36 together.

Mounted upon shaft 41 is a roller or ball bearing 42 carried by side plates 43 which also serve to connect the bearing 42 to a bearing 44 mounted upon a drive shaft 46. Drive shaft 46 is supported for rotation in suitable bearings 47 mounted on each side plate of the machine. The drive shaft extends to a prime mover such as an electric motor (not shown). That portion 46a of the drive shaft which carries the bearing 44 is made about $\frac{1}{32}$ of an inch off center with respect to that portion of the shaft 46 mounted in bearings 47. Upon rotating shaft 46 at about 1800 R. P. M. the connecting link, provided by plates 43, bearing 44 and bearing 42, between the drive shaft 46 and shaft 41 causes shaft 41 to be oscillated rapidly about the center of shaft 39. This serves to vibrate the supporting rail structure 33 for the endless chains. The importance of this vibration and its utility will be presently further explained.

Articles to be oriented are supplied by an endless feed conveyor 161 including apertured strips 162 moving over a skid plate 163 to the right in Figure 1 to release articles into a cooperatively positioned receptacle 28 on conveyor 10. Conveyor 161 and conveyor 10 are moved in a timed relation because the shaft 164 carrying sprocket 166, which supports the conveyor 161, is driven from shaft 12 by a gear 167 thereon driving a gear 168 on shaft 164 (Figure 2). The feed conveyor is more particularly shown in my Patent 2,190,970.

Means are provided for wetting the articles supplied for orientation. In the drawings (Figures 1 and 2), I have shown a header 171 connected to a suitable liquid source and having a pipe 172 extending therefrom over each row of the article receptacles 28. Suitable spray nozzles 173 are provided on each pipe 172 to spray liquid down onto the receptacles to maintain articles therein wet. Water, brine, an edible oil or other suitable liquid can be employed and can be otherwise supplied to maintain the articles and the receptacles wet while undergoing the orientation operation, as is disclosed in my Patent 2,308,038.

As appears particularly in Figure 7, each fruit holder 28 includes an upper tubular portion 121 slidable in plate 27 and a lower tubular guide element 122 slidable in plate 22. The holder is formed with an exterior shoulder 123 which abuts against plate 27 under the force of a spring 124 encircling the holder and compressed between plate 22 and the shoulder 123. Downward movement is limited by shoulder 126.

In accordance with this invention, the fruit holder is formed with a suitable interior configuration enabling an article therein to be positioned in a desired alignment. Thus, each fruit holder 28 includes an interior fruit receiving portion 125 and a fruit aligning portion 130. The portion 125 corresponds to an inverted frustum of a cone, the sides of which are at a relatively large angle to one another, one of the order of about 50° to about 90°. The lower portion of the cone, the fruit aligning portion, also corresponds to an inverted frustum of a cone, the sides of which, however, are at a relatively acute angle to one another, one of the order of about 22° to about 44°. The fruit aligning portion terminates in a section 135 which corresponds to a portion of a cylinder to provide a restriction or neck so that the fruit is held firmly in the fruit alignment portion during pitting and does not pass; below the cylindrical section 135, the receptacle flares outwardly as at 140 so that the pit will pass through readily.

The largest diameter of the upper portion 125 must be equal to and is preferably slightly greater than the major axis of the largest size of fruit to be handled; obviously, smaller fruit can be handled readily and the smallest will fall readily into place. The heighth of the two portions must also be related to the largest size of fruit to be handled and I have found that the upper portion should have a heighth measured along the cavity axis of at least about 15% to preferably about 30% of the minor axis of the fruit. The heighth of the upper portion is not too critical in that the deeper this portion is made, the more it acts as a funnel and one can exceed the 30% limit except as the use of a plurality of such cavities in a row may make the machine inordinately wide.

The lower portion of the chuck should have a heighth of about 55% to about 110% of the major axis of the fruit. The angle between the two wall portions should also be coordinated so that the fruit passes readily into the lower portion and to ensure this the lower portion is preferably made at least 20° smaller.

By employing the chuck of this invention the chuck lower portion can be made with its walls at a smaller acute angle than has been possible heretofore. This improves the pitting operation, making pit removal more certain and resulting in fewer unpitted fruit or broken pits. Preferably, the angle of the lower portion is 30° or less; I have employed chucks having the following wall angles:

| Chuck | A | B | C | D |
| --- | --- | --- | --- | --- |
| Upper portion_____degrees__ | 50 | 50 | 60 | 90 |
| Lower portion_____do____ | 28 | 24 | 30 | 28 |
| Difference_____do____ | 22 | 26 | 30 | 62 |

Figure 15:
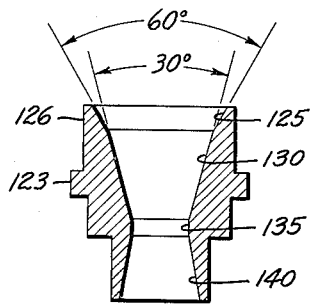
Figure 16:
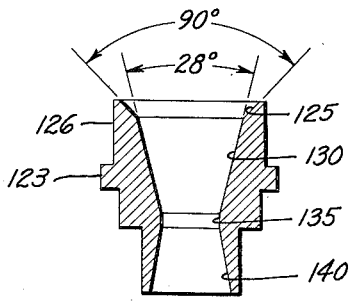

The upper portion can be arcuately formed, preferably being slightly convex in section to fit smoothly into the lower portion so that the fruit slips readily over the chuck surface. Chucks corresponding to those indicated at A, C and D above are shown, respectively, in Figures 14, 15 and 16.

In the following table I have shown the characteristics of the chucks referred to above with respect to the heighth of the upper portion compared to the minor axis of the fruit and the heighth of the lower portion compared to the major axis:

| Chuck | A | B | C | D |
| --- | --- | --- | --- | --- |
| Upper Portion—Percent of minor axis____ | 52 | 20.7 | 52.0 | 17.4 |
| Lower Portion—Percent of major axis____ | 53.4 | 75 | 73.5 | 80 |

Pitting mechanism generally indicated at 50 is mounted between opposite parallel vertically extending side members 51 supported on frame 6 and joined together by horizontal member 52 and rods extending through each side member 51 and secured thereto by nuts 54. Between the side plates is mounted a suitable means for moving the pitting mechanism with a reciprocating movement over the plane of the carrier structure 10 and, at the same time, for an up and down movement, so that the pitting mechanism moves toward and away from the horizontal plane of the carrier structure 10, as will presently be described in detail.

A motor and speed change device 85 is mounted on members 51 and 52 and a belt or chain 83 is extended from this about a pulley or sprocket 84 on a shaft 39 in the pitting mechanism. Another belt or chain 87 is extended about a pulley or sprocket 86 on the shaft 39 and about a pulley or sprocket (not shown) on shaft 13 so that the pitting mechanism and the conveyor 10 are moved in a timed relationship. Shaft 39 is the drive shaft for the pitting mechanism and one can refer to my Patents 2,157,518 and 2,219,832 for details of the means utilized to impart the desired motion to the pitting structure and particularly to plungers 71 which depend to support the pitting mechanism.

A plate 91 is mounted upon the extending ends of the plungers 71 and extends transversely across the machine. It carries a plate 99 which supports a plurality of fruit cutting knives or plungers indicated generally at 92. These knives can be arranged in one or more rows across the plate 99 and in the machine illustrated two rows are employed. The construction of the knives is shown in detail in Figure 7.

Each pitting knife is provided as a sub-assembly mounted in a cylinder 93 which is suitably retained in the plate. A plunger 94 carries the knife 92 for a reciprocating movement against the bias of spring 96, which is positioned between a head on the plunger and a disc 97 screwed into the end of the cylinder to retain the spring in place and to serve as a guide for the hollow plunger stem which extends through plate 97. A rod 98 is screwed into the knife 92 through the hollow plunger stem to retain the knife in place in the plunger 94. A broken knife is quickly replaced by holding knife 92 and rotating the rod 98 to release the knife.

A plurality of coring knife sub-assemblies are mounted in plate structure 138 which extends across the machine. A coring knife structure is also provided comprising a sub-assembly 129 including a hollow tubular knife 130 in which a pit ejector 132 is slidable in a spaced relationship to permit the entrance of air so that any solid material in the coring knife can be readily ejected by the ejector 132. The coring knife is threaded as at 133 into a nut 134 which is also positioned on threaded end 136 of guide 137 (Figure 7).

Each guide 137 is mounted in a guide bushing 135a in the plate 138. A spring 143 is positioned between each nut 134 and plate 138 to provide for a resilient mounting of the coring knife. The pit ejector 132 is supported in the base structure generally indicated at 146; each ejector extends through the pitting knife to eject material in the knife, as will be presently described.

The pitting plungers and the coring knives are moved by the pitting head in a timed relation such that when the knives 92 are lowered, the coring knives are raised so the two approach each other until they practically engage; in any case, they are brought together until the space between them is less than the length of the fruit stone to be removed so that the stone is held firmly between them. The core ejectors, however, are only moved by the pitting head so the coring knives reciprocate on these and the relative movement thus provided is effective to eject any core retained in the tubular knives. A suitable mechanism for achieving such movement is shown in my Patent 2,406,736. To strip any meat adhering to the plungers 92, a stripper is provided made up of plate 181 which extends transversely of the machine and through which the knives extend.

The coring knife can be made stationary and the plunger can force the fruit and receptacle down to it. However, this involves more travel for the plunger and receptacle.

To permit of ready removal of the fruit, I provide a conduit 201 having a plurality of nozzles 202 therein, each nozzle, as appears in Figure 6, having a central aperture 203 therein leading outwardly to a slot 204. Each nozzle is positioned opposite the path of movement of a line of the carriers so that the spray from the nozzle fans out from the aperture 203 over a path defined by the slot and which is several inches in extent, such path being parallel and in the plane of movement of the apertures in the underside of the carriers. Upon supplying a suitable fluid to the nozzle under an adequate pressure, the latter sprays the fluid against the underside of the carriers with such force that the fruit is ejected from the carriers. Usually a pressure of 25 to 60 pounds suffices and I have successfully used a pressure of 45 pounds; water from the usual water supply main can be used successfully.

The operation of the machine will become further apparent upon considering the following sequence of operation, particularly in connection with Figures 3, 4, 5 and 7 through 13. The description will be made as the machine is operated continuously. However, it is to be understood that it can be operated sequentially if desired, that is, instead of moving the pitting, coring mechanisms and the conveyor structure 10 continuously, the conveyor structure 10 can be moved to a pitting and coring position and brought to rest, the stoning, coring and pit-removing mechanisms operated, whereupon the conveyor mechanism is advanced. However, this sequential operation is not nearly so fast and continuous operation is usually greatly preferred.

In operation, conveyor 161 delivers the articles to the conveyor 10 in any position; referring particularly to Figures 3-5, an article such as an olive may be dropped into receptacle 28 so that it lies almost completely across the receptacle (Figure 3). With the walls of the receptacle wet, the rapid vibration to which the receptacle is subjected when it passes on to intermediate rail section 33 causes the article to slip out of engagement with the relatively blunt conoidal portion 125 of the receptacle (Figure 4) and into a position wherein the article aligns itself with its major axis parallel to the major cavital axis of the receptacle (Figure 5). The article is thus correctly positioned for its subsequent coring and pitting operation in conoidal portion 130.

It being understood that shaft 39 is rotated at a suitable speed, and that conveyor 10 is being operated in a timed relationship therewith, and that each receptacle 28 contains fruit in alignment, the fruit is advanced to the fruit pitting and coring station as appears in Figure 1. It will be noted in Figure 7 that the pitting plunger 92 and the coring knife 130 are shown approaching the fruit in the receptacle 28 but that the fruit has not been cut by either. In Figures 8 and 13, it will be observed that the pitting plunger first engages the fruit, entering the fruit and engaging the stone to compress spring 124 and force the receptacle 28 down to the limit of its travel and until shoulder 126 engages the plate 27 to force the fruit into engagement with the coring knife and cut a core in the fruit. The cutting of the core in the particular machine disclosed is effected by movement of the receptacle 28 and movement of the coring knife. This enables the travel of the coring knife and of the receptacle to be kept to a minimum; the spring 124 regulates the amount of pressure which can be placed upon the fruit and so ensures that the portion of the fruit engaged with the sides of the receptacle is not bruised or otherwise harmed.

In Figures 8-13, the degree marks placed on each view indicate the relative position of the various parts shown following movement of the pitting mechanism and particularly rotation of shaft 39 through the indicated number of degrees from a zero position, corresponding to that of Figure 7 wherein the coring knife and the pitting plunger are practically fully retracted. Referring to Figures 8-13, it will be noted in Figure 8 that the pitting plunger and the coring knife are shown approaching the fruit in receptacle 28 but that the fruit has not been cut by either. In Figure 9, following 10° of rotation of shaft 39, the pitting plunger has entered the fruit and the receptacle 28 has started to move down, compressing spring 124. This movement continues (Figure 10) and after 78 degrees of rotation of shaft 39, the receptacle has reached the limit of its travel, shoulder 126 on the carrier has engaged plate 27, and the fruit is now engaged between the pitting plunger and the coring knife, the latter having started to enter and cut the core in the fruit into the stone. In Figure 11, the stone is shown as firmly grasped between the pitting plunger and the coring knife, the pit resting on the circular open tubular end of the coring knife. At the instant that the core and the pit break loose from the fruit, spring 124 is effective to move the receptacle upwardly; in practice, the breaking loose of the core and pit is really effected by the tension applied by spring 124, the latter moving the receptacle upwardly to engage plate 27 with such rapidity that, in effect, the receptacle snaps back into its original position. The downward movement of the pitting plunger and coring knife is coordinated, as appears particularly in Figure 12, to move the pit and core out of the fruit, the pitting plunger and coring knife continuing downward until this is attained. Thereafter, the pitting plunger is removed or is retracted, this being indicated in part in Figure 13, after 120° of rotation of the shaft. Complete retraction is secured after about 140° of rotation of shaft 39.

The views shown cover the period from 50° to 120° of rotational movement of shaft 39. The remaining circular movement, that is, from 120° through 0° and to 20°, covers the remaining cycle of operation, the only feature of which is the retraction of the coring knife and the pit removing plunger 132 to such an extent that the core and stone are rejected if they happen to still be retained in place under the coring knife. The foregoing is illustrative only and one need not employ the exact timing indicated.

The coring operation results in the fruit being jammed in the lower conoidal portion of the receptacle with such force that difficulty is encountered in removing the fruit. Since it is obvious that the receptacle must be cleared for placement of additional fruit subsequently upon return of the conveyor to position beneath the feed conveyor 61, means are provided, in accordance with this invention, for removing the fruit from the receptacles 28. As has been described previously, this means comprises the spray nozzle 202 supplied with a fluid under sufficient pressure to cause effective removal of the fruit jammed in the cavity upon the fluid passing upwardly through the bottom of the cavity as the receptacles pass the nozzles, as appears in Figure 1.

From the foregoing, I believe it will be apparent that I have provided a relatively novel, simple and improved device for orienting and pitting fruit.

I claim:

1. A chuck for the orienting and pitting of an elongated fruit having a major and a minor axis, the chuck comprising a receptacle having a cavity therein symmetrically disposed about its major axis and defined by an upper conoidal portion and a lower conoidal portion adjacent to said upper portion, said upper portion being in the form of an inverted frustrum of a cone and having its largest diameter approximately equal to the major axis of the fruit, with opposite cavity walls at an angle of from 50° to 90°, said lower portion continuing and being of smaller diameter than said upper portion and in the form of an inverted frustrum of a cone with opposite cavity walls at an angle of from 22° to 44° and at least 20° smaller than the angle included between the opposite cavity walls of said upper portion, the upper portion being of a heighth measured along said cavity axis which is at least about 15% of the minor axis of the fruit, the lower portion having a heighth measured along said cavity axis of at least about 55% of the major axis of the fruit.

2. A chuck as in claim 1 wherein the cavity walls of the upper portion are at an angle of about 50° and the cavity walls of the lower portion are at an angle of about 28°.

3. A chuck as in claim 1 wherein the cavity walls of the upper portion are at an angle of about 60° and the cavity walls of the lower portion are at an angle of about 30°.

4. A chuck as in claim 1 wherein the cavity walls of the upper portion are at an angle of about 90° and the cavity walls of the lower portion are at an angle of about 28°.

GEORGE W. ASHLOCK, Jr.

REFERENCES CITED

The following references are of record in the file of this patent:

UNITED STATES PATENTS

| Number | Name | Date |
| --- | --- | --- |
| 2,271,675 | Ashlock, Jr. | Feb. 3, 1942 |
| 2,314,862 | Ashlock, Jr. | Mar. 30, 1943 |
| 2,388,814 | Ashlock, Jr. | Nov. 13, 1945 |
| 2,407,126 | Ashlock, Jr. | Sept. 3, 1946 |